United States Patent
Dufour et al.

(10) Patent No.: US 9,783,427 B2
(45) Date of Patent: Oct. 10, 2017

(54) METHOD OF RECYCLING HYDROCHLORIC AND HYDROFLUORIC ACID EFFLUENT

(71) Applicant: Arkema France, Colombes (FR)

(72) Inventors: Pascal Dufour, Caluire et Cuire (FR); Cyrille Le Toullec, Villeurbanne (FR)

(73) Assignee: ARKEMA FRANCE, Colombes (FR)

( * ) Notice: Subject to any disclaimer, the term of this patent is extended or adjusted under 35 U.S.C. 154(b) by 683 days.

(21) Appl. No.: 14/350,195

(22) PCT Filed: Oct. 1, 2012

(86) PCT No.: PCT/FR2012/052214
§ 371 (c)(1),
(2) Date: Apr. 7, 2014

(87) PCT Pub. No.: WO2013/050690
PCT Pub. Date: Apr. 11, 2013

(65) Prior Publication Data
US 2014/0294711 A1     Oct. 2, 2014

(30) Foreign Application Priority Data
Oct. 6, 2011 (FR) ...................... 11 59026

(51) Int. Cl.
| | | |
|---|---|---|
| *B01D 3/10* | (2006.01) | |
| *C01B 35/06* | (2006.01) | |
| *C01B 7/01* | (2006.01) | |
| *C01B 7/07* | (2006.01) | |
| *C01B 7/19* | (2006.01) | |

(52) U.S. Cl.
CPC .............. *C01B 35/061* (2013.01); *B01D 3/10* (2013.01); *C01B 7/0712* (2013.01); *C01B 7/195* (2013.01); *C01B 7/01* (2013.01); *C01B 7/07* (2013.01); *C01B 7/19* (2013.01); *C01B 7/191* (2013.01); *C01B 7/196* (2013.01); *C01B 35/06* (2013.01); *C01B 35/063* (2013.01); *C01B 35/065* (2013.01)

(58) Field of Classification Search
CPC ..... C01B 7/0706; C01B 35/06; C01B 35/061; C01B 35/063; C01B 35/065; C01B 35/066; C01B 35/068; C01B 7/0712; C01B 7/195; C01B 7/196; C01B 7/197; B01D 3/10; B01D 3/36
See application file for complete search history.

(56) References Cited

U.S. PATENT DOCUMENTS

| | | | |
|---|---|---|---|
| 2,343,462 A | | 3/1944 | Laird et at. |
| 2,805,982 A | * | 9/1957 | Swinehart ............... C01B 35/06 203/12 |
| 3,353,911 A | | 11/1967 | Moller et al. |
| 3,920,825 A | | 11/1975 | Becher et al. |
| 4,061,723 A | * | 12/1977 | Feser ....................... B01J 15/00 423/276 |

FOREIGN PATENT DOCUMENTS

| | | |
|---|---|---|
| EP | 0425922 A1 | 5/1991 |
| EP | 0582914 A1 | 2/1994 |
| FR | 2195588 A1 | 3/1974 |
| FR | 2370685 A1 | 6/1978 |
| GB | 985769 A | 3/1965 |
| JP | 2008-189483 A | 8/2008 |

OTHER PUBLICATIONS

English Translation of EP 425,922 obtained from Espacenet.*
International Search Report (PCT/ISA/210) dated Dec. 6, 2012, by the European Patent Office as the International Searching Authority for International Application No. PCT/FR2012/052214.

* cited by examiner

*Primary Examiner* — In Suk Bullock
*Assistant Examiner* — Jonathan Pilcher
(74) *Attorney, Agent, or Firm* — Buchanan Ingersoll & Rooney P.C.

(57) ABSTRACT

A method of recycling mixtures of hydrochloric and hydrofluoric acid. In particular, a method of recycling hydrofluoric acid and boron fluoride mixtures. A process for upgrading mixtures of fluoroboron compounds contaminated with chlorides as an aqueous solution of boron fluoride hydrates, including a step of vacuum distillation. Also, a method of producing gaseous boron trifluoride.

8 Claims, No Drawings

METHOD OF RECYCLING HYDROCHLORIC AND HYDROFLUORIC ACID EFFLUENT

BACKGROUND OF THE INVENTION

The present invention relates to a process for upgrading mixtures of hydrochloric and hydrofluoric acid. The invention is more particularly directed towards a process for upgrading hydrofluoric acid. It is also directed towards a process for manufacturing gaseous boron trifluoride.

Chlorofluorohydrocarbons (for example chlorodifluoromethane), hydrofluorocarbons (for example tetrafluoroethane) or hydrofluoroolefins (for example tetrafluoropropene) are generally obtained by reacting a chlorinated hydrocarbon with hydrofluoric acid in liquid or gas phase in the presence of a catalyst. Hydrofluoric acid is generally used in super-stoichiometric amount in this reaction. Besides the desired fluoro compound, hydrochloric acid is formed, which, in the presence of hydrofluoric acid, poses a separation problem.

The recovery of hydrochloric acid and hydrofluoric acid in the abovementioned reaction is not easy. Standard separation methods, for example distillation, do not make it possible to obtain hydrofluoric acid of sufficient purity. It should be noted that residual amounts of chlorides, greater than 50 mg/dm$^3$, in hydrofluoric acid are harmful in certain applications such as the stripping of steel plates.

To improve the separation of hydrochloric acid from hydrofluoric acid and soluble fluorides, document U.S. Pat. No. 2,343,462 proposes to distill an aqueous solution containing hydrochloric acid and hydrofluoric acid or soluble fluorides in the presence of boric acid or a soluble borate. The examples illustrate the purification of hydrochloric acid contaminated with hydrofluoric acid or fluorides using boric acid. However, this separation method generates fluoroboron mixtures contaminated with chlorine, which are thus difficult to upgrade.

The term "fluoroboron mixtures" means dilute solutions of boron trifluoride hydrates composed of mixtures of $BF_3 \cdot 2H_2O$, boric acid $H_3BO_3$ and hydrated fluoroboric acids $HBF_4 \cdot zH_2O$ as explained in the scientific publications by Christian A. Wamser, J. Amer. Chem. Soc. Volume 73, pages 409 to 413 of 1951 and of the supplement Von Stephan Pawlenko, Zeitschrift für anorganische und allgremeine Chemie, Band 300; 1959, z not being a figure determined with precision.

The term "hydrochlorofluoric acid" means a mixture of HF, HCl and $H_2O$, optionally with very small amounts of metal chloride.

Moreover, boron trifluoride ($BF_3$) is a gas that is mainly used in the industry as a catalyst in a large number of reactions: polymerization, esterification, alkylation, isomerization. Gaseous, anhydrous boron trifluoride is generally obtained by reacting liquid anhydrous hydrofluoric acid with boric acid dissolved in sulfuric acid and by supplementary addition of oleum. Gaseous boron trifluoride is also obtained by treatment with sulfuric acid or sulfuric acid as a mixture with oleum of a concentrated aqueous solution of $BF_3$ hydrate. However, the presence of impurities, such as hydrogen chloride (due to the generation of HCl gas at the same time as the $BF_3$ gas) in the concentrated aqueous solution of $BF_3$ hydrate poses a problem during the treatment with sulfuric acid. Specifically, the separation of gaseous $BF_3$ and of gaseous HCl is not only very difficult, but also very expensive.

DETAILED DESCRIPTION

A first subject of the present invention is a process for upgrading hydrochlorofluoric acid which does not have the drawbacks of the prior art. The present invention provides not only a process for upgrading an effluent comprising hydrochlorofluoric acid, but also that of upgrading hydrofluoric acid in the form of boron fluoride.

A second subject of the present invention is a process for upgrading fluoroboron mixtures contaminated with chlorides.

The process according to the present invention comprises (i) at least one step during which at least one boron compound chosen from boric acid ($H_3BO_3$), metaboric acid ($HBO_2$) and boric anhydride ($B_2O_3$) is placed in contact with an aqueous hydrochlorofluoric acid solution to give a mixture of fluoroboron compounds and of hydrochloric acid; (ii) a distillation step to give, on the one hand, hydrochloric acid and, on the other hand, a mixture comprising water, residual hydrochloric acid and a mixture of fluoroboron compounds, and (iii) a step of vacuum distillation of the mixture obtained in step (ii) to remove the residual hydrochloric acid and the water in order thus to give a concentrated aqueous solution of boron trifluoride hydrates.

The aqueous hydrochlorofluoric acid solution to be upgraded may originate from a manufacturing unit involving at least one hydrofluorination reaction of chlorinated organic compounds, especially units for manufacturing chlorofluorohydrocarbons, hydrofluorocarbons or hydrofluoroolefins.

The aqueous solution to be upgraded preferably comprises from 0.005% to 38% by weight of hydrochloric acid, from 1% to 65% by weight of hydrofluoric acid, water being the remainder to 100% of the addition of the percentages of HCl and HF.

Advantageously, the aqueous solution to be upgraded preferably comprises from 0.005% to 21% by weight of hydrochloric acid, from 1% to 41% by weight of hydrofluoric acid, water being the remainder to 100% of the addition of the percentages of HCl and HF.

This aqueous solution may also comprise light volatile organic compounds such as chloroform, dichlorofluoromethane, chlorodifluoromethane, tetrafluoroethane or trifluoroacetic acid.

Steps (i) and (ii) may be simultaneous or consecutive.

The HF/boron compound mole ratio expressed as the mole ratio of the element F per mole of element B in step (i) of the process according to the present invention may be between 1 and 4 and preferably between 2.5 and 3.

An F/B ratio of between 3 and 4 of concentrated $BF_3$ hydrate solutions may be likened to a mixture of $BF_3 \cdot xH_2O$ and of $HBF_4 \cdot zH_2O$, with x ranging from 2 to 4 and z ranging from 3 to 6.

The temperature at which step (i) is performed is preferably between 0° C. and 120° C., that of step (ii) is preferably between 25° C. and 120° C. and advantageously between 40° C. and 110° C.

Steps (i) and (ii) of the process according to the present invention are preferably performed at atmospheric pressure.

According to a preferred mode of the invention, step (iii) is performed under conditions such that the mixture of fluoroboron compounds preferably contains between 100 mg and 330 g of chloride per kg of fluoroboron compound mixture, advantageously between 100 mg and 210 g of chloride per kg of fluoroboron compound mixture.

The temperature at which step (iii) is performed is preferably between 30° C. and 90° C. and advantageously between 60° C. and 90° C.

Step (iii) of the process according to the present invention is preferably performed at an absolute pressure of between 10 and 100 mbar such that the boron trifluoride hydrate after concentration and purification at the end of step (iii) contains less than 100 mg of chloride per kg of $BF_3$ hydrates.

A second subject of the present invention is a process for upgrading mixtures of fluoroboron compounds, contaminated with chlorides, as an aqueous solution of boron fluoride hydrates, comprising a vacuum distillation step.

The preferred conditions of the vacuum distillation step are the same as those for step (iii) of the process according to the first subject.

A third subject of the present invention is a process for manufacturing gaseous trifluoride, comprising (i) at least one step during which at least one boron compound chosen from boric acid ($H_3BO_3$), metaboric acid ($HBO_2$) and boron anhydride $B_2O_3$ is placed in contact with an aqueous solution of hydrochloric acid and hydrofluoric acid to give a mixture of fluoroboron compounds and of hydrochloric acid; (ii) a distillation step to give, on the one hand, hydrochloric acid and, on the other hand, a mixture comprising water, residual hydrochloric acid and a mixture of fluoroboron compounds; (iii) a step of vacuum distillation of the mixture obtained in step (ii) to remove the residual hydrochloric acid and the water and thus to give an aqueous solution of boron trifluoride hydrate, and (iv) a step during which the concentrated aqueous solution of boron trifluoride hydrate is subjected to a treatment with concentrated sulfuric acid or of sulfuric acid or with oleum (solution of sulfuric anhydride in sulfuric acid) to give gaseous boron trifluoride.

The treatment temperature of step (iv) is preferably between 75 and 135° C. and advantageously between 100 and 115° C.

The process according to the present invention may be performed in batch or semi-continuous or continuous manner.

A batch process consists in loading the reactor with hydrochlorofluoric acid and then in introducing boric acid or vice versa for a given period, while cooling to take into account the exothermicity of the reaction and with a partial release of HCl depending on the temperature. In a batch process, step (iii) may be performed in the same reactor as the preceding steps and the HCl and water are removed by reducing the pressure and gradually increasing the temperature until a concentrated $BF_3$ hydrate is obtained. The chloride concentration gradually decreases as step (iii) proceeds until, at the end of step (iii), less than 100 mg of chloride per kg of $BF_3$ hydrate are obtained. Next, sulfuric acid is added, followed by gradual addition of oleum, until all the $BF_3$ gas has been evolved in the gas phase. The sulfuric acid formed in the reactor is emptied out.

In a semi-batch process, only a part, especially step (iii), is in continuous mode.

In a continuous process, all the operations may be continuous. For example, the mixture of fluoroboron compounds may be manufactured in a first reactor by feeding in hydrochlorofluoric acid concomitantly with boric acid at atmospheric pressure and at a temperature maintained by cooling for steps (i) and (ii). In a second reactor, the $BF_3$ hydrate is maintained at a virtually constant level by feeding in the mixture of fluoroboron compounds with its hydrochloric acid originating from the first reactor and withdrawal of boron fluoride hydrate at the bottom of the reactor. Under reduced pressure and at a moderate temperature, the water and HCl are simultaneously removed in the gas phase. On startup, the second reactor is loaded with $BF_3.xH_2O$ hydrate originating, for example, from a batch process. The $BF_3$ hydrate withdrawn at the bottom of the second reactor and a stream of oleum and of sulfuric acid may feed a third reactor to generate anhydrous $BF_3$ gas.

The temperature at which step (iii) of the continuous process is performed is advantageously between 60 and 80° C. such that the boron trifluoride hydrate throughout the concentration and purification permanently contains less than 100 mg of chloride per kg of $BF_3$ hydrates. The $BF_3$ hydrate withdrawn from the bottom of the reactor contains less than 100 mg of chloride per kg.

Experimental Section

To characterize concentrated $BF_3$ hydrates obtained via the process of the invention, a certain number of analytical techniques were used.

The density is a measurement taken by any type of densimeter by producing calibration standards of $BF_3$ dissolved in water with between 50% and 70% of $BF_3$ and by proportionally correlating the density value to the mass concentration as a percentage of $BF_3$.

The assay of the chlorides in the $BF_3$ hydrates is performed by introducing a silver nitrate solution of known concentration (Molar/100) to precipitate out silver chloride. A potentiometric electrode detects the equivalent point corresponding to the conversion of all the chlorides by the silver cation $Ag^+$. To improve the sensitivity, known amounts of chlorides are added to the $BF_3$ hydrate sample, when the amount of chlorides is too low to be detected. Via this method, the chloride detection limit is 10 mg/$dm^3$. This is a method specific for chloride. A calibration standard containing the known concentration of the element Cl at 25 mg/$dm^3$ in a $BF_3$ hydrate calibration standard is measurable via this method and is confirmed by another specific method of X-ray fluorescence (FX) without diluting the sample.

The assay of the boron of $BF_3$ hydrate may be performed by ICP, i.e. optical "inductively coupled plasma". This is a technique which replaces atomic absorption using a plasma torch which ionizes the boron element with emission of light at 249.773 nanometers as a function of the boron concentration. A dilution calibration range of different concentrations of boric acid adjusted with acetic acid at a pH of between 4 and 5 serves as the calibration straight line. The light intensity is reported on this calibration curve to find the boron concentration. This is an absolute method with no possible interference.

To assay the fluorine and the boron, an indirect volumetric method exists, which can be used only after it has been ensured that the sample from the tail stock does not contain any chloride, i.e. no HCl or in amounts of less than 100 mg/kg of $BF_3$ hydrate. If the sample contains HCl, it will be necessary to subtract it from this indirect method. The volumetric method is that of the article by "Christian A. Wamser, J. Amer. Chem. Soc. Volume 73, pages 411-412 (1951), FIG. 4" and is briefly described below.

It consists in decomplexing the fluorine of concentrated $BF_3$ hydrate by introducing 200 microliters (microdm$^3$) in 130 cm$^3$ of 4% by mass $CaCl_2$ solution and then in reacting at the boiling point with reflux for 30 minutes. For each mole of fluorine, one mole of assayable HCl is generated after cooling with NaOH via a pH jump according to:

$$2BF_3.yH_2O + 3CaCl_2 + 6H_2O \rightarrow 2H_3BO_3 + 3CaF_2 + 6HCl + 2yH_2O$$

The hydrochloric acid generated is assayed with sodium hydroxide and the equivalent point is measured on the typical curve of FIG. 4 of the Wamser article below pH 7, according to:

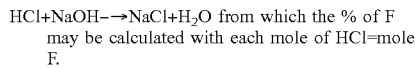
from which the % of F may be calculated with each mole of HCl=mole F.

By continuing the assay for a second pH jump above 7 to measure the equivalent point of the first acidity of boric acid with a base, the content of B is obtained: see also this FIG. 4:

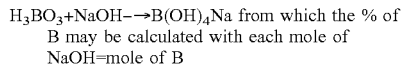
from which the % of B may be calculated with each mole of NaOH=mole of B This method was checked on a calibration range with an F/B mole ratio ranging from 2.5 to 4. This calibration range is manufactured by adding dosed HF to predosed boric acid. No methyl orange or phenolphthalein colored indicator is used for the equivalent point, but by direct reading of the graph pH=function of the volume of sodium hydroxide titrated.

Example 1

The mixture to be separated originates from a fluorohydrocarbon manufacturing unit, with the following composition:
17.3% by weight of HCl
21.8% by weight of HF
60.7% by weight of water
chlorodifluoromethane, $CHF_2Cl$: 2200 mg/dm$^3$
chloroform<5 mg/l
1070 g of the mixture are introduced over 5 hours, using a peristaltic pump, into a reactor—jacketed evaporator maintained at 35° C., equipped with a dip tube and containing beforehand 113.5 g of water, 186.5 g of 37 mass % hydrochloric acid and 240.7 g of boric acid with a purity of 99.99%. The presence of HCl in the reactor before addition makes it possible to conserve the HCl concentration of the hydrochlorofluoric solution. The amount of hydrochloric acid to be removed is thus very high.

Lightening of the suspension and clarification of the liquid slightly before the end of the introduction of hydrochlorofluoric acid are observed.

The reactor is then cooled to 26° C. and then placed under vacuum at a pressure of about 30 mbar absolute with running of a coolant on a distillate station set at 1° C. The initial bottom temperature under this vacuum is 26° C., and it is then gradually raised by heating over 178 minutes to reach a value of 72° C. at 30 mbar. Atmospheric pressure is reestablished with nitrogen after switching off the vacuum pump.

1086 g of distillate are obtained with a density of 1.130 at 20° C., which is in agreement with that of a 20.2 mass % hydrochloric acid with a density of 1.100. 109 g of liquid of the same density are found in the cardice trap.

The tailstock contains 407 g of concentrated $BF_3$ hydrates having the following characteristics:
Density 1.572 at 28° C. allowing a titer estimation of 60.7% $BF_3$ if the F/B mole ratio=3.00
The boron and fluorine are assayed by volumetry
Mass % of F=50.6%
Mass % of B=9.6%
% $BF_3$ by mass with B+F=60.2%
% of water=100−(B+F) %=39.8% calculated by difference $H_2O$/B calculated=2.5
F/B mole ratio calculated=3.0
Analysis of the chlorides, less than 10 mg per dm$^3$
Total organic carbon: less than 10 mg/dm$^3$ Example 2

Hydrochlorofluoric acid, originating from a distillation of a mixture of acids derived from a chlorofluorocarbon manufacturing unit, has the following composition:
28.7% by weight of HF
0.57% by weight of HCl
70.5% by weight of water
Chlorodifluoromethane, $CHF_2Cl$: 1800 mg/dm$^3$ 800 g of this impure hydrochlorofluoric acid are placed in a jacketed glass reactor with a peristaltic pump equipped with a plastic tube. The glass reactor contains beforehand a suspension consisting of 236.5 g of boric acid $H_3BO_3$ with a purity of 99.99% in 300 g of demineralized water. The temperature rises gradually from 19 to about 33° C. At the end of introduction of the hydrochlorofluoric acid, a solution with no boric acid in suspension is obtained. Everything has been dissolved by reaction. Specifically, with a $BF_3$ content in the region of 20% in accordance with the table given by Christian A. Wamser, J. Amer. Chem. Soc. Volume 73, pages 409 to 413, 1951, and of the supplement by Von Stephan Pawlenko, Zeitschrift für anorganische und allgermeine Chemie, Band 300; 1959, the content of insoluble $H_3BO_3$ is zero.

The water is gradually evaporated off by lowering the pressure to about 50 mbar absolute and raising the temperature to about 39° C. to obtain the first drops of distilled water. The vapors are cooled with a glass condenser fed with a refrigerated fluid at about 0.5° C. forming a distillate recovered in a graduated flask. When the level of distillate recovered reaches the 640 cm$^3$ graduation in 90 minutes, chlorides in HCl form begin to be removed. The end of distillation of the chlorides is manifested when the volume reaches 710 cm$^3$ after 125 minutes counting from the start of the evaporation under reduced pressure. At this stage, the absolute pressure is still constant at 50 mbar, but the temperature reaches 64° C. The distillation of the water is continued for about 175 minutes until 891 cm$^3$ of distillate are obtained under 50 mbar at 86° C.

The distillation tailstock is cooled and then returned to atmospheric pressure for physicochemical evaluation of the $BF_3$ hydrates.

Density 1.567 at 21° C. allowing a titer estimation of 59.9% $BF_3$ if the F/B ratio=3.00.

The boron is assayed via the volumetric method or by plasma spectroscopy ICP.

The fluorine is assayed by volumetry.

Under these conditions, the analysis gives the following result:
Mass % of F=49.7%
Mass % of B=9.4% confirmed by ICP method
% $BF_3$ by mass with B+F=59.1%
% water=40.9%
$H_2O$/B ratio=2.6
F/B mole ratio=3.0 analysis of the chlorides, content less than 10 mg per dm$^3$ of liquid in the distillation tailstock assayed via the potentiometric method with silver nitrate Organic matter calculated as total organic carbon TOC is less than 10 mg/dm$^3$ indicating the disappearance of $CHF_2Cl$, $CHFCl_2$, $CCl_3H$.

This $BF_3$ hydrate is then converted into $BF_3$ gas by treatment with oleum as a mixture with sulfuric acid.

The same tests performed with a different constant pressure and a final temperature in relation with the distillation tailstock and the pressure show a change in the $H_2O/B$ final ratio according to:

| Constant absolute pressure in mbar during the test | Final temperature in °C. | Final mole ratio × $H_2O/BF_3$ of the $BF_3 \cdot xH_2O$ hydrate | Cl in mg/dm³ |
| --- | --- | --- | --- |
| 100 | 88 | 2.9 | Less than 10 mg/dm³ |
| 50 | 86 | 2.6 | Less than 10 mg/dm³ |
| 40 | 77 | 2.4 | Less than 10 mg/dm³ |
| 30 | 72 | 2.3 | Less than 10 mg/dm³ |
| 15 | 70 | 2.2 | Less than 10 mg/dm³ |

The chloride content is low and constant.

Example 3

The process is performed as in Example 2, except that the impure hydrochlorofluoric acid to be upgraded, derived from a 1,1,1,2-tetrafluoroethane manufacturing unit, has the following composition:

31.1% by weight of HF analyzed by prior dilution and then assaying with a fluoride-specific electrode HCl 0.4% by weight analyzed by prior dilution and then assaying by ion chromatography TFA 0.4% by weight of trifluoroacetic acid $CF_3CO_2H$, analyzed by prior dilution and then assaying by ion chromatography Water 67.7% by weight, remainder calculated by subtraction $C_2H_2F_4$: 3850 mg/dm³ or 0.4% by weight A distillation tailstock under 50 mbar absolute at a final temperature of 86° C. (359 K) and after cooling and returning to atmospheric pressure is obtained, having the following characteristics:

Density 1.568 at 21° C.
Weight % of F=49.9%
Weight % of B=9.6%
% $BF_3$ by mass with B+F=59.5%
F/B mole ratio=3.0
water=40.5%
$H_2O/B$ ratio=2.6

Analysis of the chlorides: less than 10 milligrams per dm³ of distillation tailstock liquid.

Content of trifluoroacetic acid measured by ion chromatography: less than 250 mg/dm³ of $BF_3$ hydrate in the distillation tailstock, quantifiable limit.

$C_2H_2F_4$: less than 10 mg/dm³

Example 4

665 g of hydrofluoric acid with an HF titer of 34.85% and 0.35 mass % of HCl are placed in a Pyrex glass synthesis reactor containing beforehand 300 g of water and into which has already been placed 239 g of boric acid $H_3BO_3$. The rate of introduction of the hydrochlorofluoric is 2.66 g per minute. The hydrochlorofluoric acid contains chlorodifluoromethane, $CHF_2Cl$: 1800 mg/dm³

The synthesis reactor initially at room temperature of about 20° C. heats slightly to about 41° C. At the end of the stoichiometric reaction, the 1204 g of mixture of fluoroboron compounds have a calculated $BF_3$ concentration of 21.5 mass %. The solution, which was a whitish suspension, becomes clear, and colorless to pale yellow as a function of the traces of iron chlorides present.

434 grams of a solution of $BF_3 \cdot xH_2O$ obtained according to Example 2 are placed in a single portion into a second reactor. The $BF_3 \cdot xH_2O$ has the following characteristics:

Density 1.502 at 23° C. allowing an estimation of about 55.7% $BF_3$ if the F/B ratio=3.00
Mass % of F=46.5%
Mass % of B=8.6%
% $BF_3$ by mass with % B+% F=55.1%
% water=100−55.1=44.9%
$H_2O/B$ ratio=x=3.1
F/B mole ratio=3.07

Analysis of the chlorides, content less than 10 mg per dm³

The content of this second reactor is heated to 60° C. via a jacket and at the same time a vacuum of 30 millibar is established, the absolute pressure being measured via a precision pressure sensor. The condenser with cold water at 1° C. is switched on to condense the distillate. A carbon dioxide cardice trap solidifies the traces of water escaping from the condenser.

The peristaltic pump adjustment speed is set to 12, corresponding to an average rate of about 3.4 g per minute for the 1005 g of mixture containing 21.5% fluoroboron compounds, which are injected into the 434 g tailstock of $BF_3 \cdot xH_2O$. Of the 1204 g, only 1005 g of fluoroboron compound mixture were regularly injected over 297 minutes into the second reactor to perform an evaporation according to the continuous process. At the same time, 545 g of distillate were regularly distilled off, the distillate having a density controlled at about 1.022 at 23° C., this liquid being characteristic of a water containing small amounts of hydrochloric acid. The cardice trap contains, after returning to room temperature, an aqueous liquid weighing 57 g. A small amount of water remains on the wet walls of the condenser and on the cold parts of the distillation glassware. 99 g of aqueous 21.5% fluoroboron compound mixture not used in the first reactor remain.

The test is stopped by placing the system under atmospheric pressure of nitrogen and decreasing to about room temperature of the temperature of the reactor tailstock, so as to withdraw reactor tailstock product. 2.1 g of a white product assumed to be boric acid are recovered from the condenser coils. The reactor is clean and contains 806.5 g of $BF_3$ hydrate. 372 g of reactor tailstock product are withdrawn with the peristaltic pump, this product having the following characteristics:

Density 1.490 at 22.7° C. allowing a titer estimation of 54.5% $BF_3$ if the F/B ratio=3.00
Mass % of F=45.6%
Mass % of B=8.6%
% $BF_3$ by mass with B+F=54.2%
% water=100−(B+F) %=44.8%
$H_2O/B$ ratio=3.2
F/B mole ratio=3.01

Analysis of the chlorides, content of 35 mg per dm³.

434 g of product remain, which is ready, after reapplying the vacuum and increasing the temperature to about 60° C., to continue the test according to this continuous process.

The invention claimed is:

1. A process for producing boron trifluoride hydrates, comprising:
(i) at least one step during which at least one boron compound chosen from boric acid ($H_3BO_3$), metaboric acid ($HBO_2$) and boric anhydride ($B_2O_3$) is placed in contact with an aqueous solution of hydrochlorofluoric acid at atmospheric pressure to give a mixture of fluoroboron compounds and of hydrochloric acid;

(ii) a distillation step performed at atmospheric pressure to yield a first fraction comprising hydrochloric acid and a second fraction comprising water, residual hydrochloric acid, and a mixture of fluoroboron compounds; and (iii) a step of vacuum distillation of the second fraction obtained in step (ii) to remove the residual hydrochloric acid and the water, wherein the temperature of the second fraction is increased during the vacuum distillation step so as to give a concentrated aqueous solution of boron trifluoride hydrates, and wherein the absolute pressure of the vacuum distillation step is between 10 and 100 mbar, and the concentrated aqueous solution of boron trifluoride hydrates obtained after step (iii) contains less than 100 mg of chloride per kg of boron trifluoride hydrates.

2. The process as claimed in claim 1, wherein the aqueous solution of hydrochlorofluoric acid comprises from 0.005% to 38% by weight of hydrochloric acid, from 1% to 65% by weight of hydrofluoric acid and water representing the remainder to 100%.

3. The process as claimed in claim 1, wherein the temperature of step (i) is between 0 and 120° C.

4. The process as claimed in claim 1, wherein the temperature of step (ii) is between 25 and 120° C.

5. The process as claimed in claim 1, wherein the temperature of the vacuum distillation step is between 30 and 90° C.

6. A process for manufacturing gaseous boron trifluoride, wherein after the vacuum distillation step as claimed in claim 1, the aqueous solution of boron trifluoride hydrate is subjected to a treatment with concentrated sulfuric acid or sulfuric anhydride or with oleum.

7. The process as claimed in claim 6, wherein the treatment temperature is between 75 and 135° C.

8. The process as claimed in claim 1, wherein the process is performed in batch, semi-continuous or continuous mode.

* * * * *